(12) United States Patent
Hoshino et al.

(10) Patent No.: US 10,903,947 B2
(45) Date of Patent: *Jan. 26, 2021

(54) COMMUNICATION APPARATUS AND COMMUNICATION METHOD

(71) Applicant: Sun Patent Trust, New York, NY (US)

(72) Inventors: Masayuki Hoshino, Kanagawa (JP); Seigo Nakao, Osaka (JP); Daichi Imamura, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,488

(22) Filed: Dec. 10, 2019

(65) Prior Publication Data

US 2020/0177332 A1 Jun. 4, 2020

Related U.S. Application Data

(63) Continuation of application No. 14/556,938, filed on Dec. 1, 2014, now Pat. No. 10,523,384, which is a (Continued)

(30) Foreign Application Priority Data

Apr. 27, 2009 (JP) ................. 2009-107836

(51) Int. Cl.
*H04W 4/00* (2018.01)
*H04L 5/00* (2006.01)
(Continued)

(52) U.S. Cl.
CPC .......... *H04L 5/0035* (2013.01); *H04J 11/003* (2013.01); *H04L 1/0071* (2013.01);
(Continued)

(58) Field of Classification Search
CPC ............... H04W 72/042; H04W 76/27; H04W 72/0453; H04L 5/0053; H04L 5/0007
See application file for complete search history.

(56) References Cited

U.S. PATENT DOCUMENTS 6,615,271 B1  9/2003  Lauck
7,965,791 B2 * 6/2011  Yano ................ H04L 1/0057
375/298

(Continued)

FOREIGN PATENT DOCUMENTS

JP     2007-502557     2/2007

OTHER PUBLICATIONS

3GPP TSG RAN WG1 Meeting #55bis, "Further Discussions on the Downlink Coordinated Transmission—Impact on the Radio Interface," Huawei, et al., R1-090129, Jan. 12-16, 2009, pp. 1-8.

*Primary Examiner* — Atique Ahmed
(74) *Attorney, Agent, or Firm* — Seed IP Law Group LLP

(57) ABSTRACT

A data alignment method capable of preventing degradation in demodulation performance due to variation in signal qualities when a data signal to which a Turbo code is applied is transmitted simultaneously from a plurality of cells. The method divides signal components to be used for data alignment into resources common to all the cells and resources dependent on the cells and transmits encoded and rate-matched data with the first half thereof aligned to the resources common to all the cells and the second half thereof aligned to the resources dependent on the cells.

14 Claims, 7 Drawing Sheets

Related U.S. Application Data continuation of application No. 13/266,158, filed as application No. PCT/JP2010/002988 on Apr. 26, 2010, now Pat. No. 8,937,897.

(51) Int. Cl.
 *H04L 1/00*   (2006.01)
 *H04L 1/04*   (2006.01)
 *H04J 11/00*   (2006.01)
 *H04W 72/00*   (2009.01)

(52) U.S. Cl.
 CPC ............ *H04L 1/04* (2013.01); *H04L 5/0007* (2013.01); *H04W 72/00* (2013.01)

(56) References Cited

U.S. PATENT DOCUMENTS

| | | |
|---|---|---|
| 8,315,225 B2 | 11/2012 | Xu |
| 2004/0001555 A1 | 1/2004 | Taffin |
| 2004/0187069 A1* | 9/2004 | Pietraski ............ H03M 13/6362 714/786 |
| 2005/0193310 A1* | 9/2005 | Obuchi ................ H04L 1/1819 714/752 |
| 2007/0189282 A1 | 8/2007 | Lohr |
| 2008/0225965 A1* | 9/2008 | Pi ........................ H04L 1/0068 375/260 |
| 2009/0067543 A1 | 3/2009 | Hsiao |
| 2010/0177746 A1 | 7/2010 | Gorokhov |
| 2010/0189038 A1* | 7/2010 | Chen .................... H04L 5/0023 370/328 |
| 2010/0203887 A1 | 8/2010 | Kim |
| 2010/0232373 A1 | 9/2010 | Nory |
| 2010/0260059 A1 | 10/2010 | Zhang |
| 2010/0260151 A1* | 10/2010 | Onggosanusi ........ H04W 36/18 370/336 |
| 2011/0122825 A1 | 5/2011 | Lee |
| 2011/0194523 A1 | 8/2011 | Chung |
| 2011/0237270 A1 | 9/2011 | Noh |
| 2011/0269459 A1 | 11/2011 | Koo |
| 2011/0286349 A1 | 11/2011 | Tee |
| 2011/0292903 A1 | 12/2011 | Jongren |
| 2011/0299449 A1* | 12/2011 | kwon .................... H04L 5/0023 370/312 |
| 2011/0317641 A1 | 12/2011 | Noh |
| 2012/0027110 A1 | 2/2012 | Han |
| 2016/0072612 A1* | 3/2016 | Seo ........................ H04L 1/22 370/329 |

\* cited by examiner

COMMUNICATION APPARATUS AND COMMUNICATION METHOD

CROSS REFERENCE TO RELATED APPLICATIONS

This is a continuation application of application Ser. No. 14/556,938, filed Dec. 1, 2014, which is a continuation of application Ser. No. 13/266,158 filed Oct. 25, 2011, which is a 371 application of PCT/JP2010/002988 filed Apr. 26, 2010, which is based on Japanese Application No. 2009-107836 filed Apr. 27, 2009, the entire contents of each of which are incorporated by reference herein.

TECHNICAL FIELD

The present invention relates to a radio communication apparatus and a radio communication system that can be applied to a radio communication system such as a cellular system.

BACKGROUND ART

In the radio communication system such as a cellular system, a method for obtaining a macro-diversity effect by effectively utilizing a plurality of base stations has been introduced. Hereinafter, each transmission point belonging to a base station will be referred to as a "cell," and an explanation will be given by exemplifying LTE (Long Term Evolution), which is a next generation communication system that has been examined in 3GPP (3rd Generation Partnership Project), that is, an international standards organization of mobile communication. In LTE, by introducing a hard handover process that appropriately switches connecting cells, transmission quality is ensured for signals transmitted from a transmitting apparatus (a base station and a cell) to a receiving apparatus (terminal), in communication in a downlink direction from each cell to a terminal.

In LTE-advanced (hereinafter referred to as "LTE-A") that is a communication system with further advanced LTE, introduction of a coordinated multipoint transmitting/receiving process (CoMP) has been examined in an attempt to positively utilize the micro-diversity so as to improve the data rate mainly at a cell edge. As specific systems to be used for CoMP, mainly two methods have been examined in LTE-A, for example, as shown in Non-Patent Literature 1. As specific systems to be used for CoMP, mainly two methods have been examined in LTE-A, for example, as shown in Non-Patent Literature 1.

(1) Joint processing/transmission (JP): simultaneous transmission of data from a plurality of cells toward a terminal.

(2) Coordinated beam-forming/scheduling (CB): time-frequency resources and space resources (beams) are assigned coordinately among a plurality of cells so as to reduce interference.

In these methods, unlike a simple switching process of connected cells of the hard handover in LTE, a simultaneous transmitting process and a coordinated controlling process are applied by the use of a plurality of cells.

FIG. 1 shows one example of receiving operations in terminals in JP. In LTE, as the minimum unit for use in arranging signals, a sub-carrier is defined in the frequency domain, and an OFDM symbol is defined in the time domain. Hereinafter, this is referred to as "time-frequency resource." Among a plurality of time-frequency resources possessed by itself, each cell multiplexes a control signal (PDCCH: Physical downlink control channel) and a data signal (PDSCH: Physical downlink shared channel) in the time domain, and transmits the resulting signal. More specifically, in LTE, a sub-frame is defined as the minimum unit for use in frequency scheduling and adaptive MCS controlling in the time domain. In the same manner, a resource block (hereinafter referred to as "RB") is defined as the minimum unit for use in frequency scheduling and adaptive MCS controlling in the frequency domain. Among 14 OFDM symbols located within the sub-frame, a single or a plurality of successive OFDM symbols from the leading portion are used for transmitting a control signal, while the rest of symbols in the sub-frame are used for transmitting a data signal. The determination of the number of OFDM symbols for control signals to be set in this case is carried out by each cell, and the value of 1 to 3 in the number of OFDM symbols is taken. Moreover, a cell-specific reference signal (CRS) relating to a frequency shift amount that is different among cells is also transmitted therefrom. In JP, an operation for assigning the same RB to a plurality of cells that participate in simultaneous transmission is carried out. This is indicated as PDSCH for CoMP in the figure. Moreover, as in the case of the PDSCH for non-CoMP region in the figure, a RB from which the above-mentioned resources have been excluded can be desirably assigned to a terminal to which each cell itself is connected. Furthermore, each of terminals for use in CoMP operation in JP receives a control signal from a predetermined single cell, and is notified of pieces of information as to the presence or absence of a data signal assignment to itself in the corresponding sub-frame, or as to which RB has been assigned thereto. The cell for outputting these instructions is defined as "serving cell," and the other cells that participate in simultaneous transmission are referred to as "other cell A and other cell B" in the figure.

In this simultaneous transmitting method, signals located in the PDSCH for CoMP region are simultaneously transmitted from three cells (serving cell, other cell A and other cell B) so that, even when a signal from a specific cell is subjected to serious degradation in quality due to fluctuations, such as phasing and shadowing, detection is available by the signals from the other cells, that is, a macro-diversity effect is obtained, thereby making it possible to stabilize the received quality.

CITATION LIST

Non-Patent Literature

NPL 1
3GPP TSG RAN WG1 #55bis, R1-090129, Huawei, CMCC, "Further Discussions on the Downlink Coordinated Transmission-Impact on the Radio Interface," Jan. 12-16, 2009

SUMMARY OF INVENTION

Technical Problem

In the above-mentioned conventional simultaneous transmitting method, as shown in FIG. 1, in each of the cells other than "serving cell," it is necessary to set the frequency shift amount for itself so as to transmit CRS, and in a resource at a position indicated by slanted hatching lines within a region indicated as "PDSCH for CoMP," it is not possible to transmit a data signal. Moreover, upon time-domain multiplexing the control signal and data signal, the setting of the multiplexing ratio is dependent on each cell, and each cell needs to properly set the ratio in accordance with the number of terminals belonging to the corresponding cell, or the like. Consequently, as shown in a region surrounded by a thick frame in FIG. 1, excessive or insufficient symbols on time-domain for use in data signal tend to occur in comparison with the serving cell. For this reason, the arrangement of data to be used for PDSCH for CoMP becomes different depending on each of the cells. Consequently, when observed at a terminal, a resource in which signals of the entire cells to participate in simultaneous transmission are synthesized and a resource having only signals of one portion of cells are mixedly located, with the result that among these resources, signal quality is greatly different. On the other hand, the turbo code to be used in LTE and LTE-A is designed for mainly improving resistance against white noise in an environment with small fluctuations in signal quality. For this reason, an error correcting capability is not exerted sufficiently in the above-mentioned environment that makes the signal quality greatly different, and consequently to cause degradation of the demodulation performance.

It is therefore an objective of the present invention to provide a radio communication apparatus and a radio communication method that can prevent degradation of demodulation performance due to fluctuations in signal quality in the case where data signals to which the turbo code is applied are simultaneously transmitted from a plurality of cells.

Solution to Problem

As a first aspect of the invention, there is provided a radio communication apparatus that is used in a radio communication system where radio communication is performed using a plurality of resources that are defined in a time-frequency domain based on frequency and time, the radio communication apparatus having: a resource information setting section that has a function of simultaneously transmitting an identical data signal for an identical communicating party from a plurality of communication apparatuses and sets, upon transmitting the data signal, resource arrangement information that indicates an arrangement of a first resource that is used in common for transmission between the plurality of communication apparatuses and an arrangement of a second resource that the communication apparatus individually uses for transmission; a modulation-mapping section that, based on the resource arrangement information, arranges a first portion of the data signal that has been subjected to a rate-matching process on the first resource, and arranges a second portion of the data signal that has been subjected to the rate-matching process on the second resource; and a transmission section that transmits the data signal containing a control signal and a cell-specific reference signal using the frequency-time domain resources.

Moreover, as a second aspect of the invention, there is provided the radio communication apparatus described above in which the resource that the communication apparatus individually uses for transmission is a time domain resource to be used to transmit a control signal.

Furthermore, as a third aspect of the invention, there is provided the radio communication apparatus described above in which the resource that the communication apparatus individually uses for transmission is a time domain resource to be used to transmit a cell-specific reference signal.

As a fourth aspect of the invention, there is provided the radio communication apparatus described above in which the resource that the plurality of communication apparatuses commonly use for transmission is a time domain resource to be used for data transmission using MBSFN sub-frames.

As a fifth aspect of the invention, there is provided the radio communication apparatus described above in which the second resource is a time domain resource that is used by the communication apparatus having the smallest number of transmissions of cell-specific reference signals among the plurality of communication apparatuses so as to transmit the cell-specific reference signal.

As a sixth aspect of the invention, there is provided a radio communication apparatus that is used in a radio communication system where radio communication is performed using a plurality of resources that are defined in a time-frequency domain based on frequency and time, the radio communication apparatus having; a resource arrangement information acquiring section that has a function of receiving an identical data signal for an identical communicating party transmitted simultaneously from a plurality of communication apparatuses, and acquires resource arrangement information that indicates an arrangement of a first resource that is used in common for transmission between the plurality of communication apparatuses and an arrangement of a second resource that the communication apparatus individually uses for transmission, which are set upon transmitting the data signal; a MIMO demodulation section that generates a likelihood from the received data signal based on the resource arrangement information; and a likelihood combining section that carries out a likelihood combining process, with a likelihood obtained from the data signal and arranged on the first resource being defined as a first portion of the data signal that has been subjected to a rate-matching process, and with a likelihood obtained from the data signal and arranged on the second resource being defined as a second portion of the data signal that has been subjected to the rate-matching process.

As a seventh aspect of the invention, there is provided a radio communication apparatus that is used in a radio communication system where radio communication is performed using a plurality of resources that are defined in a time-frequency domain based on frequency and time, the radio communication apparatus having: a resource information setting section that has a function of simultaneously transmitting an identical data signal for an identical communicating party from a plurality of communication apparatuses, and sets, upon transmitting the data signal, resource arrangement information that indicates an arrangement of a first resource that is used in common for transmission between the plurality of communication apparatuses and an arrangement of a second resource that the communication apparatus individually uses for transmission; a modulation-mapping section that, based upon the resource arrangement information, arranges a portion of the data signal that has been subjected to a rate-matching process, corresponding to a redundancy version notified to the communicating party by the control signal, on the resource to be used in common between the plurality of radio communicating apparatuses, and arranges a second portion of the data signal that has been subjected to the rate-matching process on the second resource, corresponding to the redundancy version notified to the communicating party by the control signal, to which an offset is applied, on the resource which the communication apparatus uses individually for transmission; and a transmission section that transmits the data signal containing a control signal and a cell-specific reference signal using the frequency-time domain resources.

As an eighth aspect of the invention, there is provided the above-mentioned communication apparatus in which the offset to be applied to the resource that is individually used by the communication apparatuses for transmission is a value that is dependent on an identification number of the communication apparatus.

As a ninth aspect of the invention, there is provided a radio communication apparatus that is used in a radio communication system where radio communication is performed using a plurality of resources that are defined in a time-frequency domain based on frequency and time, the radio communication apparatus having; a resource arrangement information acquiring section that has a function of receiving an identical data signal for an identical communicating party transmitted simultaneously from a plurality of communication apparatuses, and acquires resource arrangement information that is commonly used by the plurality of communication apparatuses for transmission and resource arrangement information that is used by the communication apparatuses to individually carry out transmission, which have been set upon transmitting the data signal; a MIMO demodulation section that generates a likelihood from a received signal based on the resource arrangement information upon receiving the data signal; and a likelihood combining section that carries out a likelihood combining process, with a likelihood obtained from the signal arranged on a resource that is commonly used among the plurality of communication apparatuses for transmission being defined as a portion corresponding to redundancy version notified by a control signal of the data signal that has been subjected to a rate-matching process, and with a likelihood obtained from the signal arranged on a resource that is used by the communication apparatuses to individually carry out transmission being defined as a portion corresponding to the redundancy version to which an offset separately notified is applied.

As a tenth aspect of the invention, there is provided a radio communication base station apparatus that is provided with the radio communication apparatus described in any one of the above-mentioned modes.

As an eleventh aspect of the invention, there is provided a radio communication mobile station apparatus that is provided with the radio communication apparatus described in any one of the above-mentioned modes.

As a twelfth aspect of the invention, there is provided a radio communication method in which a plurality of radio communication apparatuses simultaneously perform radio communication by transmitting an identical data signal for an identical communicating party using a plurality of resources that are defined in a time-frequency domain based on frequency and time, and the method has the steps of: upon transmitting the data signal, setting resource arrangement information that is used in common for transmission between the plurality of communication apparatuses and resource arrangement information that the communication apparatus individually uses for transmission; based upon the resource arrangement information, arranging a first half portion of the data signal that has been subjected to a rate-matching process on a resource that is used in common for transmission between the plurality of communication apparatus, and arranging a second half portion of the data signal that has been subjected to the rate-matching process on a resource that the communication apparatus individually uses for transmission; and transmitting the data signal containing a control signal and a cell-specific reference signal using the resources that are defined in the time-frequency domain.

As a thirteenth aspect of the invention, there is provided a radio communication method which performs radio communication by receiving an identical data signal transmitted simultaneously from a plurality of communication apparatuses using a plurality of resources that are defined in a time-frequency domain based upon frequency and time, and the method has the steps of: acquiring resource arrangement information that is used in common for transmission between the plurality of communication apparatuses and resource arrangement information that the communication apparatus individually uses for transmission, which have been set upon transmitting the data signal; and upon receipt of a data signal, generating a likelihood from the received data signal based upon the resource arrangement information, and carrying out a likelihood combining process, with a likelihood obtained from the signal arranged on the resource that is commonly used among the plurality of communication apparatuses for transmission being defined as a first half portion of the data signal that has been subjected to a rate-matching process, and with a likelihood obtained from the signal arranged on the resource that the communication apparatus individually uses for transmission being defined as a second half portion of the data signal that has been subjected to the rate-matching process.

With the above-mentioned arrangement, signal components for use in data arrangement are classified into the all-cell common resource and the cell-dependent resource, and the first half of the data that have been subjected to a coding process and a rate-matching process are arranged on the all-cell common resource, and the second half thereof are arranged on the cell-dependent resource, and the resulting data are transmitted; thus, more systematic bits are arranged on the all-cell common resource that allows the macro-diversity effect to be more positively obtained, and transmitted so that it becomes possible to minimize degradation of demodulation performance that is caused by the fact that signal quality is greatly different between resources to use for data arrangement. Thus, it becomes possible to prevent degradation of the throughput, and consequently to minimize the possibility of systematic bits having a high degree of importance being arranged on a resource in which the presence or absence of transmission is changeable because of cell dependence. Therefore, it is possible to suppress degradation of demodulation performance caused by the lack of micro-diversity effect in bits having a high degree of importance. Consequently, the coordinated multi-point transmitting and receiving processes can be realized with superior performances.

Moreover, upon arranging coded data on the all-cell common resource and the cell-dependent resource, data having a value RV_a that gives instructions about RV (redundancy version) in a downlink control channel are arranged on the all-cell common resource, and data corresponding to RV_a+N by the use of a predetermined offset value N are arranged on the cell-dependent resource, respectively. Thus, it is possible to allow the phenomenon in that a large difference occurs in signal qualities between resources for use in data arrangement to be dealt with as the same operation as that of a packet combining process of HARQ (Hybrid Automatic Repeat reQuest), and consequently to suppress degradation of demodulation performances.

Advantageous Effects of Invention

The present invention makes it possible to provide a radio communication apparatus and a radio communication method capable of preventing degradation of demodulation performances due to fluctuations in signal quality, upon simultaneously transmitting a data signal to which turbo code is applied from a plurality of cells.

DESCRIPTION OF EMBODIMENTS

Figure 1:
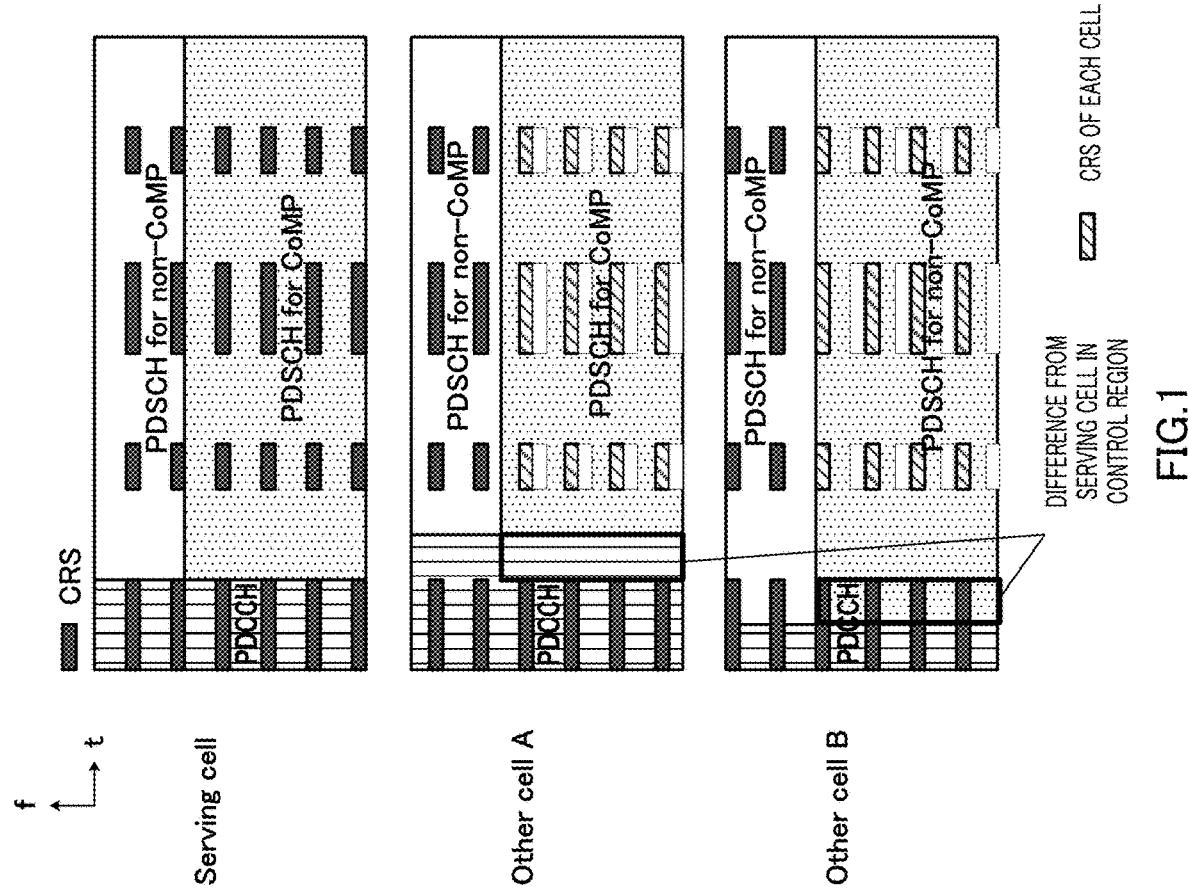
FIG. 1 is a drawing that shows a conventional example of a data arranging method for use in simultaneous transmission.

The following embodiments will exemplify a system in which a radio communication apparatus and a radio communication method of the present invention are applied to a cellular system for use in mobile communication such as a cellular phone. In this case, for example, a base station (BS) forms a transmitting apparatus and a terminal (UE: User Equipment) of a mobile station forms a receiving apparatus so as to configure a radio communication system by which communications are carried out. In this case, a plurality of cells composed of a single or plurality of base stations are supposed to carry out communications with terminals that are adapted to carry out simultaneous communications. Here, each of the cells to participate in the simultaneous communications is supposed to form a communication system that transmits a signal corresponding to the same transmission data to each single terminal. At this time, each cell is supposed to transmit a reference signal subjected to a frequency shift in response to an identification number of the cell itself, and also to determine a ratio to be used upon multiplexing a control signal with a data signal in accordance with the number of connection terminals of its own, the total number of resources that are required for transmitting the control signals to the respective terminals, etc.

Embodiment 1

As described in the "prior art," in LTE, the number of OFDM symbols, which is set by each cell for transmitting a control signal in a sub-frame in accordance with the number of terminals that belong to the cell itself, is set to 3 or less. Moreover, each cell-specific reference signal is arranged on a specific sub-carrier prepared by applying a frequency shift inherent to each cell onto a predetermined OFDM symbol. In the present embodiment, signal components to be used for data arrangement are classified into all-cell common resources and cell-dependent resources, and the first half of data that have been coded and subjected to a rate-matching process is arranged on the all-cell common resource and the second half thereof is arranged on the cell-dependent resource; thus, data transmission is carried out. That is, in the present embodiment, data transmission is carried out, with more systematic bits being arranged on the all-cell common resource from which the macro-diversity effect is obtained more positively.

In this case, the cell-dependent resource is defined as a resource that each cell needs to transmit toward a terminal relating to its own connection, in addition to data signal, and more specifically, corresponds to a time-domain resource to be used upon transmitting a control signal or a cell-specific reference signal. The all-cell common resource is defined as a time domain resource capable of accepting data arrangement, from which the cell-dependent resource has been removed.

By providing a structure that uses the above-mentioned data arranging method, it is possible to minimize degradation of demodulation performance caused by a large difference in signal qualities between resources to use for data arrangement, and consequently to prevent degradation of through put. More specifically, by minimizing the probability that systematic bits having a higher degree of importance are arranged on such a resource as to be changeable in the presence or absence of transmission because of the cell dependence, it becomes possible to suppress degradation of the demodulation performance caused by the fact that no macro-diversity effect is obtained in the bits having high degree of importance. Thus, it is possible to realize coordinated multi-point transmitting/receiving processes in a cellular system with superior performances.

The following description will discuss a specific example of configurations of a receiving apparatus and a transmitting apparatus for a radio communication system in accordance with the present embodiment.

Figure 2:
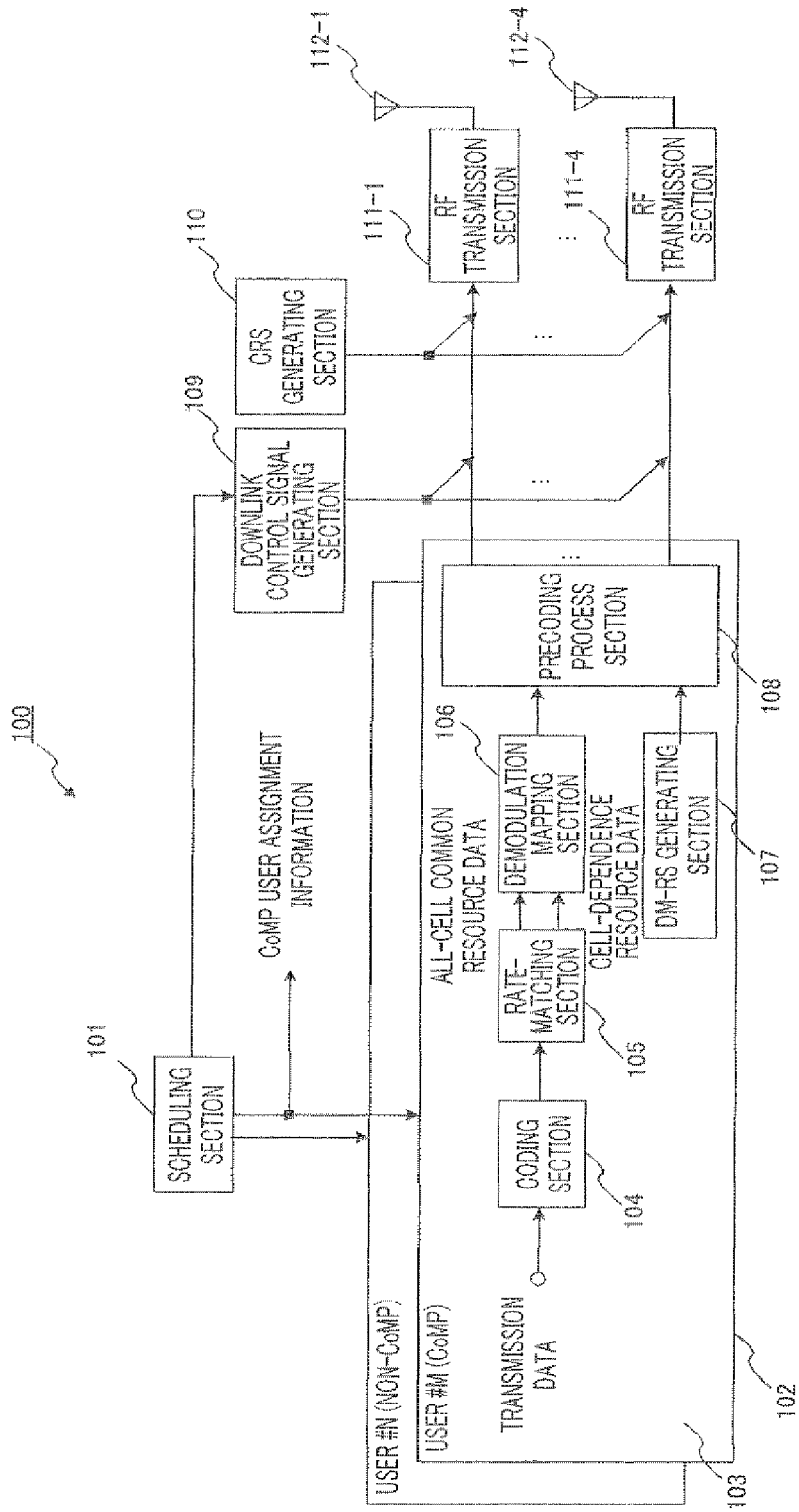
FIG. 2 is a block diagram that shows a configuration of a main portion of a transmitting apparatus to be used in embodiment 1 of the present invention.
Figure 3:
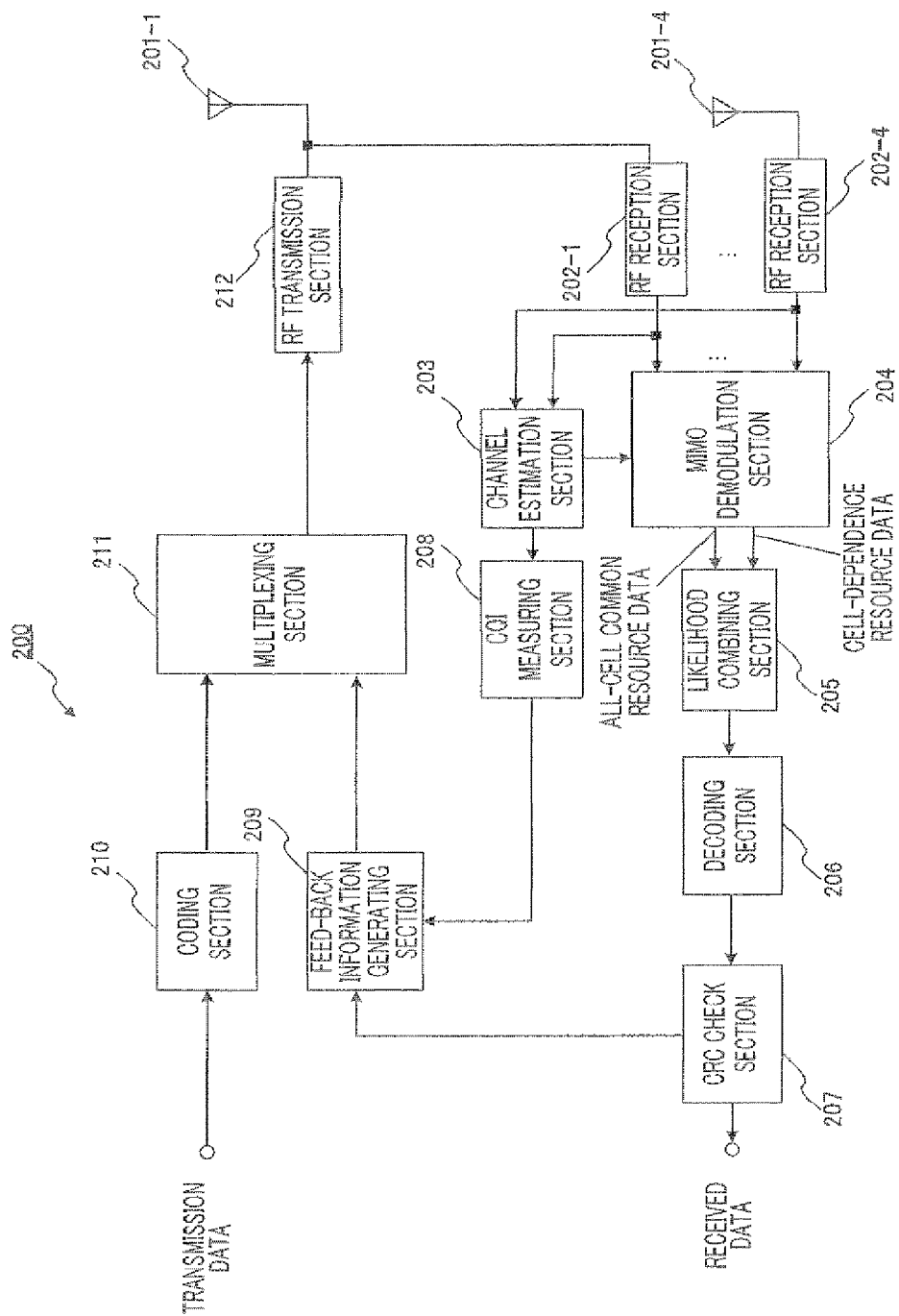
FIG. 3 is a block diagram that shows a configuration of a main portion of a receiving apparatus to be used in embodiment 1 of the present invention.

FIG. 2 is a block diagram that illustrates the configuration of a main portion of the receiving apparatus to use in the present embodiment, and FIG. 3 is a black diagram that illustrates the configuration of a main portion of the transmitting apparatus to use in the present embodiment.

In the present embodiment, it is assumed that radio communications are carried out using radio waves between the transmitting apparatus shown in FIG. 2 and the receiving apparatus shown in FIG. 3. In this case, the transmitting apparatus shown in FIG. 2 is assumed to be used as a radio communication base station apparatus (BS: base station) of the cellular system, and the receiving apparatus shown in FIG. 3 is assumed to be used as a terminal (UE) that is a radio communication mobile station apparatus, such as a cellular phone. Moreover, in this case, a coordinated multi-point transmitting/receiving system, which carries out simultaneous data transmissions from a plurality of transmitting apparatuses to a specific receiving apparatus, is configured and it is assumed that the transmitting apparatus can carry out transmitting processes to a plurality of receiving apparatuses, and that on the transmission end, a precoding transmission capable of executing weighting processes on a plurality of antennas is carried out. Additionally, as a form of the communication signals, for example, it is assumed that a multi-carrier communication system by the use of OFDM (Orthogonal Frequency Division Multiplexing) signals is adopted to carry out communications. As a specific example, the following description exemplifies a system in which a base station serving as a transmitting apparatus carries out communications to and from a terminal serving as a receiving apparatus.

Transmitting apparatus 100 shown in FIG. 2 is provided with: a plurality of terminal processing blocks 102 and 103, coding section 104, rate-matching section 105, modulation-mapping section 106, DM-RS generating section 107, precoding process section 108, a plurality of RF transmission sections 111-1 to 111-4, a plurality of antennas 112-1 to 112-4, scheduling section 101, downlink control signal generating section 109, and CRS generating section 110.

Based on channel quality information separately received as a report from the receiving apparatus, scheduling section 101 carries out a frequency scheduling process and an adaptive MCS controlling process, as scheduling processes relating to the transmission signal.

Downlink control signal generating section 109 generates a control signal relating to each of the users based on assigned information to the users received from scheduling section 101, and sets the number of OFDM symbols that are set for transmitting the control signal so that the corresponding control format information (PCFICH: Physical Control Format Indicator Channel) is generated.

Each of terminal processing blocks 102 and 103, which carries out signal processing on transmission signals suitable for the respective user terminals for use in CoMP, non-CoMP, etc., is provided with coding section 104, rate-matching section 105, modulation-mapping section 106, DM-RS generating section 107, and precoding process section 108. Coding section 104 carries out a coding process, a sub-block interleaving process, etc. on the transmission data, and outputs the resulting data to rate-matching section 105. Rate-matching section 105 carries out a rate-matching process based on the frequency scheduling information and the adaptive MCS information of the corresponding user instructed by scheduling section 101, and divides the data into the all-cell common resource data and the cell-dependent resource data so that the resulting data is outputted to demodulation-mapping section 106. Modulation-mapping section 106 modulates the received respective data into digital modulated symbols such as PSK (Phase Shift Keying) and QAM (Quadrature Amplitude Modulation) symbols, using a modulation scheme that is suitable for adaptive MCS information, and maps the respective data over the all-cell common resource or the cell-dependent resource of respective time-frequency resources so that the resulting data is outputted to precoding process section 108. DM-RS generating section 107 outputs a reference signal DM-RS for use in coherent detection to precoding process section 108 for each of transmission layers of the corresponding user. Precoding process section 108 carries out weighting processes on respective transmission signals to be outputted to a plurality of antennas so as to form beams for the transmission layers, and outputs the respective transmission signals to RF transmission sections 111-1 to 111-4 of the respective antennas.

In each of RF transmission sections 111-1 to 111-4, after the transmission signal has been subjected to processes, such as a serial/parallel conversion and an inverse Fourier transform, the resulting signal is converted into a high-frequency signal within a predetermined radio frequency band, and after having been power-amplified, the resulting signal is transmitted from each of antennas 112-1 to 112-4 as radio waves. In the transmission section in the example of the drawings, transmission signals to be transmitted through four antennas are generated. Transmission signals from the transmitting apparatus are transmitted to the receiving apparatus as data signal, etc., including a CRS, a downlink control signal and a DM-RS, as well as various data. In this case, the CRS and the control signal are transmitted as non-directional signals that do not form beams, and the DM-RS and the data signal are transmitted as directional signals that are allowed to form predetermined beams in accordance with beam numbers in predetermined transmission channels by the precoding.

Figure 4:
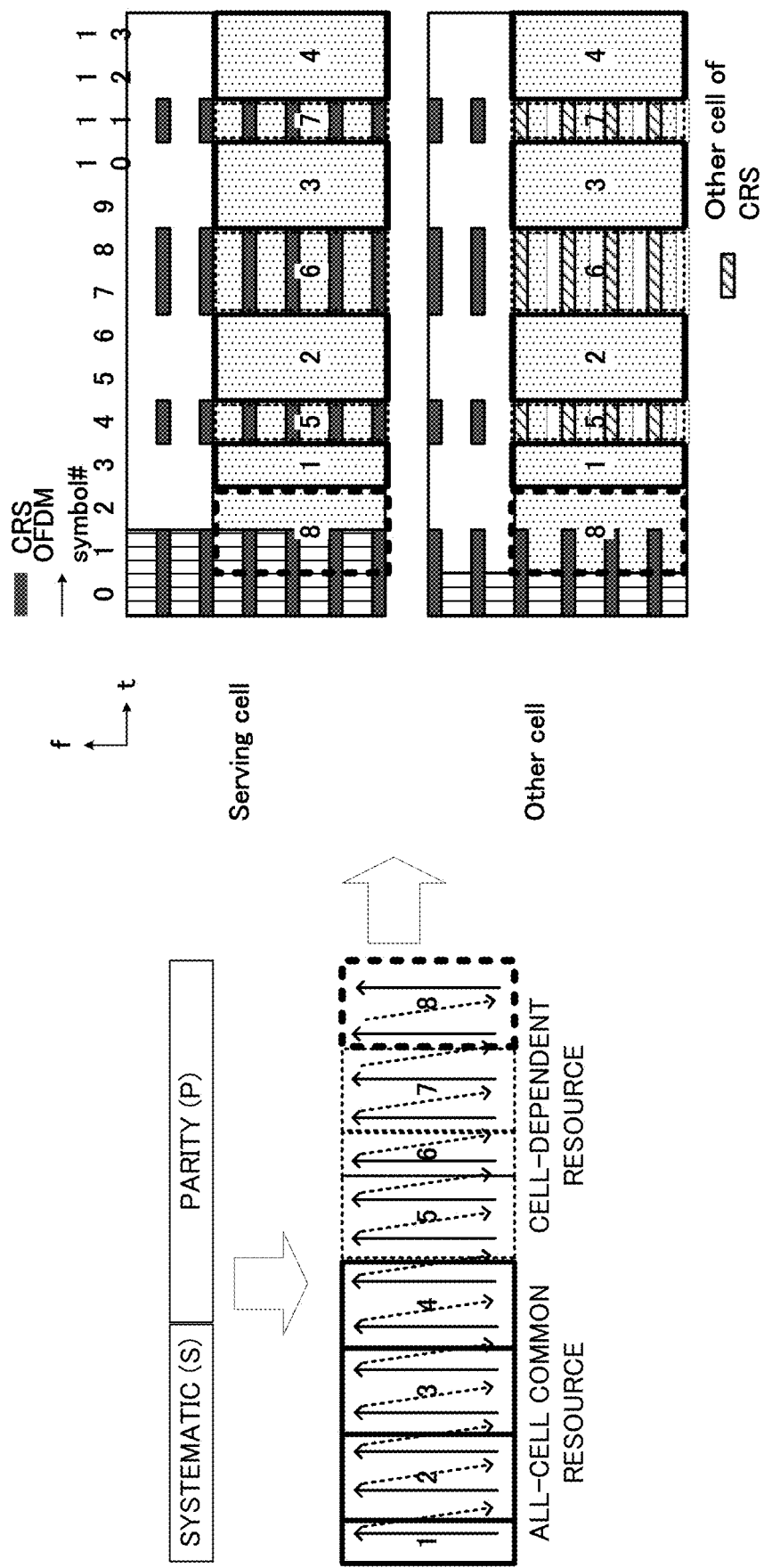
FIG. 4 is a drawing that shows a data arranging method in embodiment 1 of the present invention.

The following description will discuss a mapping method for data signals in which data for the all-cell common resource and data for the cell-dependent resource are classified, in detail. FIG. 4 is a drawing that shows the mapping method for data signals in embodiment 1, and illustrates an example of arrangements of systematic bits and parity bits on a data section, and the all-cell common resource and the cell-dependent resource. In embodiment 1, among OFDM symbols on which data signals can be arranged, except for OFDM symbols that allow the control signal and CRS to be arranged thereon, resources that include third in symbol number from the first (an area surrounded by a solid line with a thick frame indicated by 1 in the figure), successively, fifth and sixth (indicated by 2 in the figure), ninth and tenth (indicated by 3 in the figure), and twelfth and thirteenth (indicated by 4 in the figure) are defined as the all-cell common resources. On the other hand, resources that include fourth in symbol number (an area surrounded by a dotted line with a thick frame indicated by 5 in the figure), seventh and eighth (indicated by 6 in the figure) and eleventh (indicated by 7 in the figure) on which CRS can be arranged, as well as twelfth (indicated by 8 in the figure) on which the control signal can be arranged, are defined as cell-dependent resources. Next, the following description will discuss an arranging rule of bits after having been coded in LTE shown in the figure. In LTE, the bit after having been coded is provided with a systematic bit (S) that is a data main body prior to the coding process and a parity bit (P) that is a redundancy bit to be applied by the coding process. Moreover, in LTE, signals after having been rate-matched are arranged in an assigned resource from the first portion of the resource based on a frequency-first (frequency preference) rule. In other words, in one assigned resource, after respective sub-carriers have been arranged from the leading OFDM symbol in succession from the systematic bit in the frequency domain, the sequence returns to the leading sub-carrier of the next OFDM symbol so that the arrangement in the frequency domain is carried out, and these processes are repeated to the last symbol. Therefore, among data to be transmitted, the systematic bit is arranged on the leading side in the time domain within the assigned resource, while the parity bit is arranged on the rear side. In the present embodiment, a rearrangement of the data arranging symbols is carried out based on the aforementioned rule. More specifically, virtually, the all-cell common resource is arranged at a position on the leading side in the time domain, and the cell-dependent resource is arranged at a position on the rear side in the time domain. By carrying out this rearrangement, it becomes possible to arrange more systematic bits using symbols on the leading side in the virtually corresponding resource, that is, by the all-cell common resource. Moreover, with respect to the cell-dependent resource, in "serving cell," no signal is arranged in the time-frequency resource corresponding to CRS of its own, and in addition to this, in "other cell," data that correspond to the time-frequency resource corresponding to CRS of the "serving cell" (resource indicated by white-void portion in "other cell" in the figure) and time-frequency resource (resource at a position indicated by slanted hatching lines) on which CRS of its own is arranged are replaced by CRS's.

On the other hand, a receiving apparatus 200 shown in FIG. 3 is provided with: a plurality of antennas 201-1 to 201-4, a plurality of RF reception sections 202-1 to 202-4, channel estimation section 203, MIMO demodulation section 204, likelihood combining section 205, decoding section 206, CRC check section 207, CQI measuring section 208, feedback information generating section 209, decoding section 210, multiplexing section 211 and RF transmission section 212.

Radiowaves, transmitted from the partner apparatus (for example, transmitting apparatus shown in FIG. 2), are respectively received by individual antennas 201-1 to 201-4. A high-frequency signal of the radio waves received by antenna 201-1, which has been converted to a signal having a comparatively low frequency such as a base band signal in RF reception section 202-1, is then subjected to processes, such as a Fourier transform and a serial/parallel conversion so that the resulting signal is converted into a receiving signal of serial data. In the same manner, a high-frequency signal of the radio waves received by antenna 201-4, which has been converted to a signal having a comparatively low frequency such as a base band signal in RF reception section 202-4, is then subjected to processes, such as a Fourier transform and a serial/parallel conversion so that the resulting signal is converted into a receiving signal of serial data. These outputs from RF reception sections 202-1 to 202-4 are inputted to channel estimation section 203 and MIMO demodulation section 204.

Based on a reference signal contained in signals transmitted from the respective transmission antennas of the partner apparatuses (transmitting apparatuses) participated in simultaneous transmission, channel estimation section 203 carries out channel estimation. More specifically, channel estimation section 203 calculates a channel estimation value in the case where signals of the entire cells simultaneously transmitted are synthesized and observed, using the DM-RS, and also calculates a channel estimation value in the case where the signal of each cell is individually observed, using the CRS. These channel estimation values are inputted to CQI measuring section 208 and MIMO demodulation section 204.

CQI measuring section 208 calculates CQI serving as channel quality (received quality) using the channel estimation value outputted by channel estimation section 203, and outputs the resulting signal to feedback information generating section 209. As more specific channel quality information, for example, CQI suitable for combinations of predetermined modulation systems and coding rates, PMI for use in selecting a precoding matrix suitable for the current channel status from a predetermined codebook, RI suitable for a desired transmission stream number, etc., are proposed.

Among channel estimation values received from channel estimation section 203, using the channel estimation value in the case where the signal of "serving cell" is individually observed, MIMO demodulation section 204 detects a control signal from the signal transmitted from the "serving cell," and extracts to obtain control information such as transmission parameters, including pieces of information, such as MCS information for demodulation system and coding rate for assigned data signals and information of assigned resource block. Based on the information of the assigned resource block among the pieces of acquired control information, MIMO demodulation section 204 specifies a position of a resource on the frequency domain assigned to simultaneous transmission addressed to itself from information of assigned resource block of the acquired control information. In the present embodiment, the position on the time domain is supposed to be uniquely determined based upon the aforementioned setting shown in FIG. 4. Moreover, MIMO demodulation section 204 carries out a coherent detection process on the all-cell common resource using the channel estimation value obtained in the case where signals of the entire cells are synthesized and observed, using the data addressed to itself in which position on the frequency and time domain are specified, so that the likelihood of each of transmission bits is calculated, and outputs the resulting value to likelihood combining section 205 as data for the all-cell common resource. In addition, MIMO demodulation section 204 carries out a coherent detection process on the cell-dependent resource using the channel estimation value obtained in the case where a signal of each of the cells is individually observed so that the likelihood of each of transmission bits is calculated, and outputs the resulting value to likelihood combining section 205 as data for the cell-dependent resource.

Likelihood combining section 205 rearranges the data for the all-cell common resource and the data for the cell-dependent resource inputted from MIMO demodulation section 204 in accordance with a layout shown in FIG. 4, and carries out a de-interleaving process, a rate-dematching process, a likelihood combining process, etc. on the data, and then outputs the resulting data to decoding section 206. Decoding section 206 carries out a decoding process on the received signals so that the received data are reconstructed. At this time, decoding section 206 executes an error-correction decoding process on the signals received from likelihood combining section 205, and outputs the resulting data to CRC check section 207. CRC check section 207 carries out an error detecting process on the decoded signal outputted from decoding section 206 based upon CRC (Cyclic Redundancy Check) inspection, and outputs presence/absence information of data error indicating whether or not any error is contained in the received data after having been decoded to feedback information generating section 209. Thus, received data are outputted from CRC check section 207.

Feedback information generating section 209 generates feedback information including pieces of channel quality information (CQI, PMI, RI, etc.) calculated in CQI measuring section 208. Moreover, based upon the results of error detections in CRC check section 207, feedback information generating section 209 determines whether or not any error is contained in the received data that have been decoded, and generates ACK/NACK information. In this case, in the case where no error is included in the result of the decoding, feedback information generating section 209 generates ACK (Acknowledgement), while in the case where no error is included in the result of the decoding, it generates NACK (Negative Acknowledgement).

Coding section 210 carries out a coding process on transmission data, and outputs the resulting data to multiplexing section 211. Multiplexing section 211 carries out multiplexing processes on transmitted signals and the like including the inputted feedback information and coded transmission data. Moreover, multiplexing section 211 also carries out a rate-matching process for adaptively setting a modulation multi-value number and a coding rate, an interleaving process, a demodulation process, etc., and outputs the resulting data to RF transmission section 212. In RF transmission section 212, after the transmission signal has been subjected to processes, such as a serial/parallel conversion and an inverse Fourier transform, the resulting signal is converted into a high-frequency signal within a predetermined radio frequency band, and after having been power-amplified, the resulting signal is transmitted from antenna 201-1 as radio waves. At this time, the feedback information, such as the channel quality information and the ACK/NACK information, transmitted from the receiving apparatus, is transmitted to the transmitting apparatus as the feedback signal so as to be reported thereto.

By providing a configuration that uses the above-mentioned data arranging method, it is possible to minimize degradation of demodulation performance caused by a large difference in signal qualities between resources to use for data arrangement, and consequently to prevent degradation of throughput. More specifically, by minimizing the probability that systematic bits having a higher degree of importance are arranged on such a resource as to be changeable in the presence or absence of transmission because of the cell dependence, it becomes possible to suppress degradation of the demodulation performance caused by the fact that no macro-diversity effect is obtained in the bits having high degree of importance.

Modified Example 1

Figure 5:
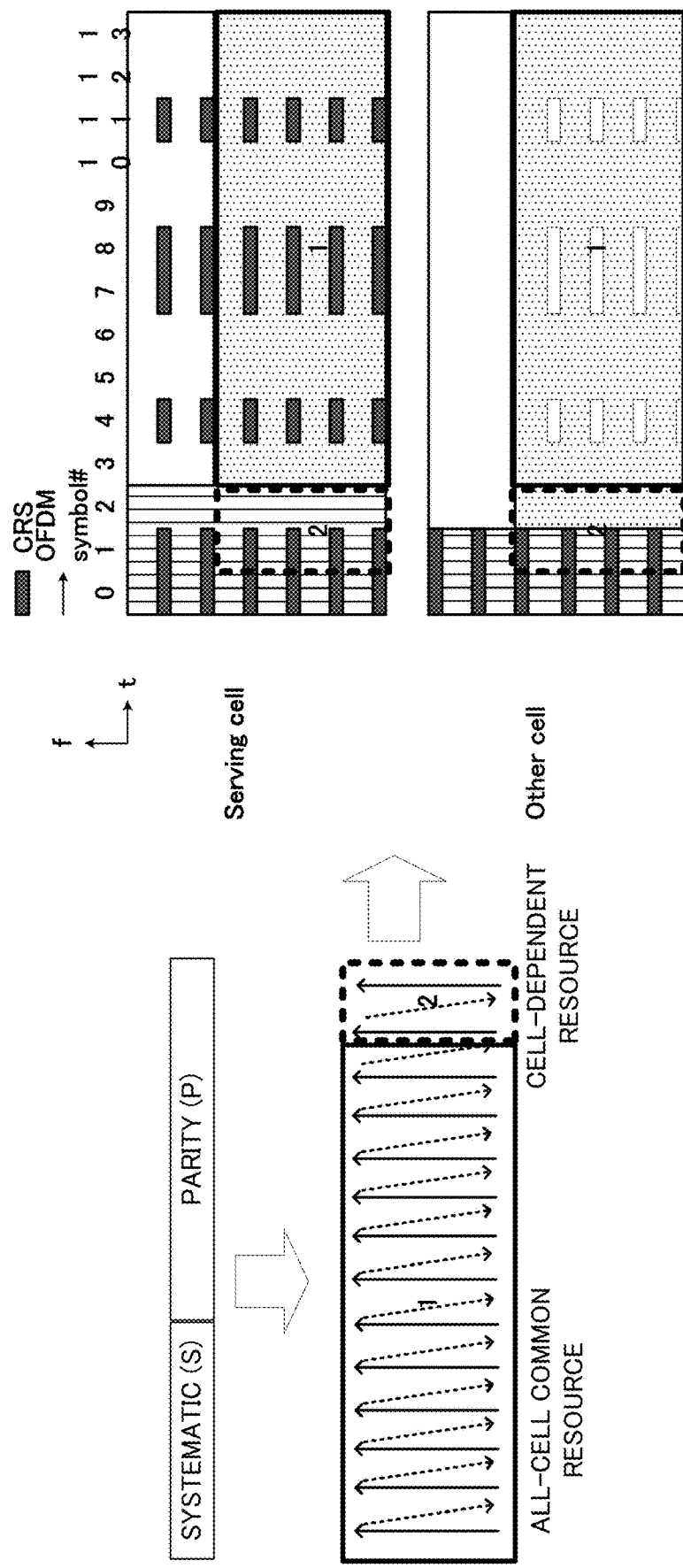
FIG. 5 is a drawing that shows a data arranging method in modified example 1 of embodiment 1 of the present invention.

Additionally, in the above-mentioned embodiment 1, the explanation has been given by exemplifying an arrangement in which both of OFDM symbol that allows a control signal to be arranged thereon and OFDM symbol that allows a CRS to be arranged thereon are dealt with as data for cell-dependent resource. However, in the present invention, either one of the OFDM symbol that allows a control signal to be arranged thereon and the OFDM symbol that allows a CRS to be arranged thereon may be prepared as data for cell-dependent resource. With this configuration, for example, even in the case where, as shown in FIG. 5S, the "other cell" transmits no CRS of a data portion in MBSFN (MBMS Single Frequency Network) sub-frame, more resources can be dealt with as the all-cell common resource.

Modified Example 2

Figure 6:
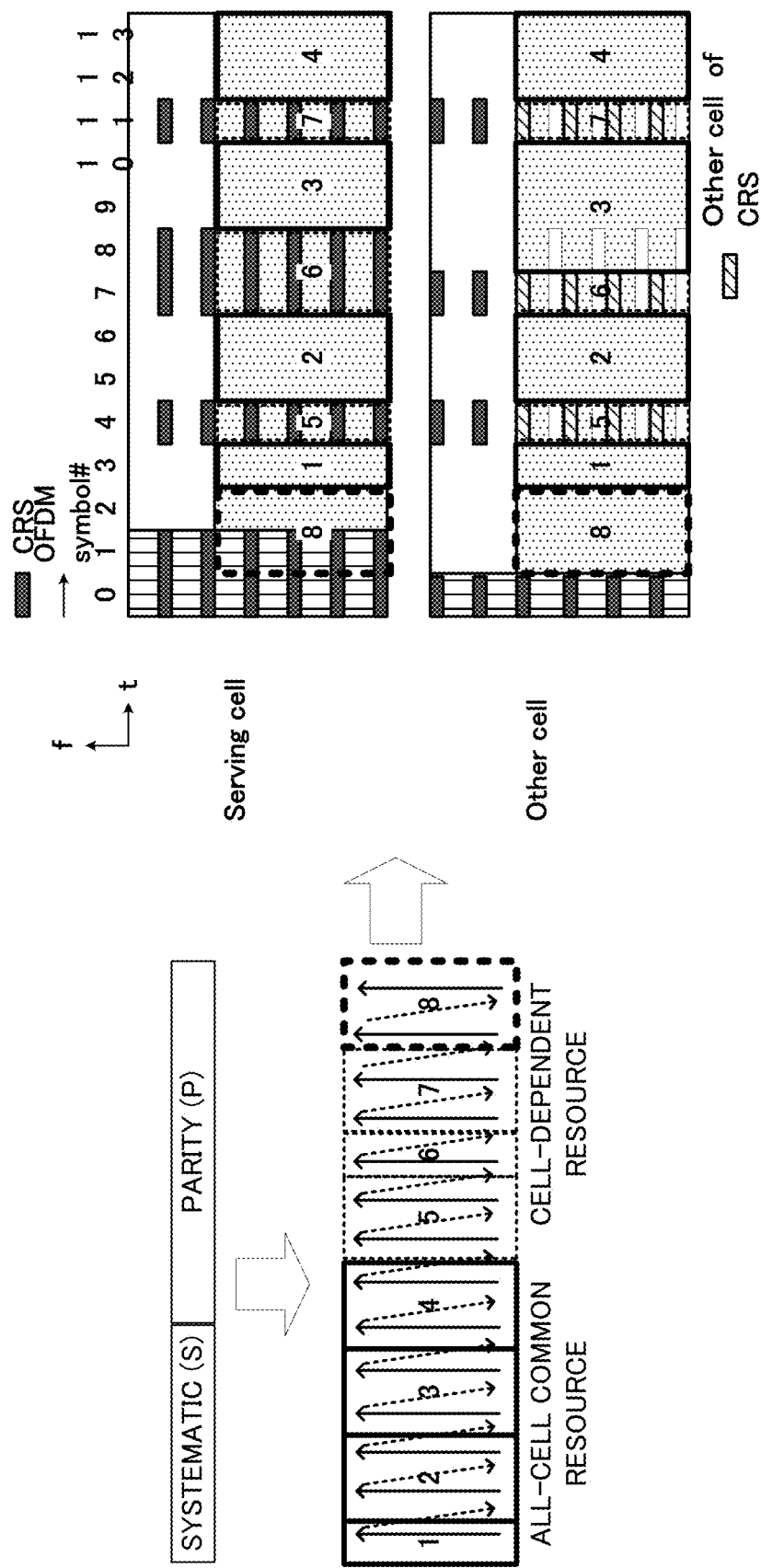
FIG. 6 is a drawing that shows a data arranging method in modified example 2 of embodiment 1 of the present invention.

Moreover, in the above-mentioned embodiment 1, the explanation has been given by exemplifying a configuration in which each of cells to participate in simultaneous transmission has the same number of antennas. However, in the present invention, in the case where the number of antennas is reduced upon CRS transmitting in the "other cell," the number of OFDM symbols that allow CRS's to be arranged thereon may be cut. With this configuration, for example, in the case where, as shown in FIG. 6, upon CRS transmitting in the "other cell," the number of antennas is 2, with no CRS being transmitted in first and eighth OFDM symbols, more resources can be dealt with as the all-cell common resource.

Modified Example 3

Moreover, in the above-mentioned embodiment 1, the cell-dependence resource is defined as a time domain resource; however, this may be defined as a time-frequency domain in a cell that participates in simultaneous transmission. More specifically, even in the case where one portion of a time-frequency domain resource is located in an OFDM symbol that is used for transmitting a cell-specific reference signal and a control signal, if each of cells that participate in simultaneous transmission has a time-frequency resource that is not used for transmitting the cell-specific reference signal and the control signal, the resource may be dealt with as a common resource for the entire cells. Specifically, among time-frequency resources including fourth in symbol number (an area surrounded by a dotted line with a thick frame indicated by 5 in the figure), seventh and eighth (indicated by 6 in the figure) and eleventh (indicated by 7 in the figure), those time-frequency resources indicated by dotted hatching lines may be dealt with as the all-cell common resources. With this configuration, more time-frequency resources can be dealt with as common resources for the entire cells.

Modified Example 4

Moreover, in the above-mentioned embodiment 1, the explanation has been given by exemplifying a configuration in which a single coding process is carried out on data irrespective of a data signal length prior to the coding; however, as in the case of LTE, an operation may be used in which data are divided into a plurality of code blocks so as not to exceed a predetermined coding length. The dividing process into the all-cell common resource and the cell-dependent resource may be limited so as to be carried out when the number of code blocks is 1. With this configuration, upon processing a plurality of code blocks, data of code blocks to be arranged at an earlier point of time in a time domain are arranged on the all-cell common resource so as to be widely arranged over the time domain; thus, it is possible to avoid a state in which the start of the processing is delayed. Moreover, in the case where the number of code blocks is 1, it becomes possible to suppress degradation of the demodulation performance caused by the fact that no macro-diversity effect is obtained in the bits having high degree of importance.

Modified Example 5

Moreover, as an operation for dividing data into a plurality of code blocks, a resource on the time domain assigned in the "serving cell" may be equally divided by the number of code blocks, and within the equally divided block, the dividing process into the all-cell common resource and the cell-dependent resource may be carried out. Thus, a decoding process can be successively carried out from a code block that is arranged at an earlier point of time in the time domain, and it is also possible to suppress degradation of the demodulation performance caused by the fact that no macro-diversity effect is obtained in the bits having high degree of importance.

Embodiment 2

In embodiment 2, upon arranging decoded data on the all-cell common resource and the cell-dependent resource, data having a value RV_a instructed in the downlink control channel relating to RV (redundancy version) are arranged on the all-cell common resource, and data corresponding to RV_a+N by the use of a predetermined offset value N are arranged on the cell-dependence resource, respectively. In this case, only the points that are different from those of embodiment 1 will be explained. The configurations of the transmitting apparatus and the receiving apparatus are the same as those of embodiment 1 shown in FIGS. 2 and 3, and the explanation thereof will be omitted. In embodiment 2, the operation of rate-matching section 105 in the transmitting apparatus, and the operation of MIMO demodulation section 204 and the operation of likelihood combining section 205 in the receiving apparatus are different.

Figure 7:
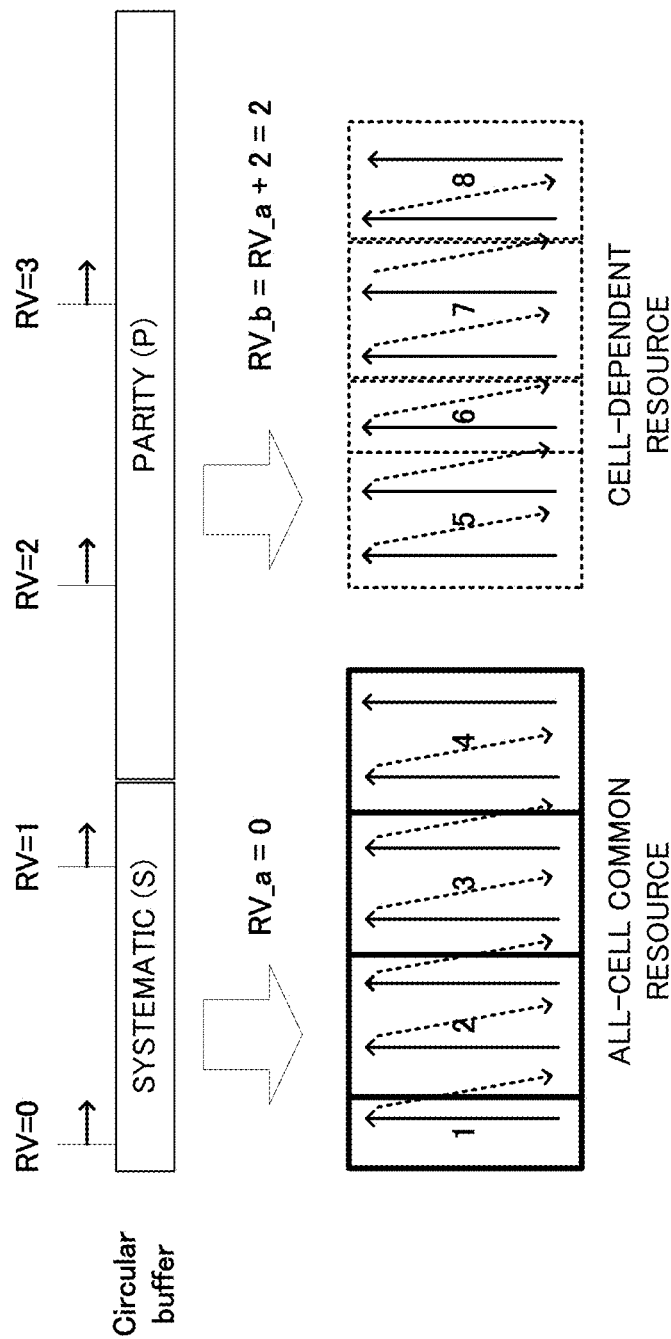
FIG. 7 is a drawing that shows a data arranging method in embodiment 2 of the present invention.

FIG. 7 is a drawing that shows a data arranging method in accordance with embodiment 2, and illustrates an example in which data after having been coded are arranged. In embodiment 2, in rate-matching section 105, among signals to be outputted by coding section 104, the number of bits that can be transmitted as data for the all-cell common resource are extracted from the starting point of RV_a, and the resulting data is outputted to the modulation-mapping section. In addition to this, among signals to be outputted by coding section 104, rate-matching section 105 extracts the number of bits that can be transmitted as data for the cell-dependent resource from the starting point corresponding to RV_a+N by the use of the predetermined offset value N, and outputs the resulting data to the modulation-mapping section. FIG. 7 shows operations in the case where RV_a=0 and N=2.

Next, the following description will discuss operations of the receiving apparatus at this time. In MIMO demodulation section 204, RV_a is taken out from the detected control signal so that RV of data for the all-cell common resource is acquired. Using the corresponding value and an offset value N notified in a separated manner, the RV for the cell-dependent resource is specified. A control signal is detected from the signal transmitted from the "serving cell," and control information such as transmission parameters are extracted and acquired, the transmission parameters including MSC information relating to a modulation scheme, a coding rate, etc. of the assigned data signal and information of the assigned resource block. Based on the information of the assigned resource block among pieces of acquired control information, a resource position on the frequency domain assigned to simultaneous transmission addressed to itself is specified. Upon outputting likelihood of each of transmission bits, MIMO demodulation section 204 outputs this to likelihood combining section 205 together with these pieces of information. Likelihood combining section 205 carries out a likelihood combining process based upon the received RV information.

By providing a configuration that uses the above-mentioned data arranging method, it is possible to allow the phenomenon in that a large difference occurs in signal qualities between resources to use for data arrangement to be dealt with as the same operation as that of a packet combining process of HARQ (Hybrid Automatic Repeat reQuest), and consequently to suppress degradation of demodulation performances.

Modified Example

Moreover, in the above-mentioned process, the offset to be applied to RV is prepared as a single value; however, different values may be used as well between cells that participate in simultaneous transmission. With this configuration, the same effect as that obtained by adding more parity bits to the packet combining process of HARQ can be achieved.

Based upon the description of the specification and the prior art techniques, various changes and modifications may be made by those skilled in the art within the scope not departing from the gist and scope of the present invention, and those modifications and adaptations will remain within the scope of the present invention.

In the above-mentioned embodiments, the explanation has been given by exemplifying antennas; however, antenna ports may be applied to the present invention in the same manner. The antenna port refers to a theoretical antenna constituted by a single or a plurality of physical antennas. In other words, the antenna port does not necessarily refer to a single physical antenna, but sometimes refers to an array antenna or the like composed of a plurality of antennas. For example, in LTE, it is not necessarily specified as to how many physical antennas are used to form an antenna port, and it is specified as a minimum unit to which a base station can transmit different reference signals. Moreover, the antenna port may sometimes be specified as a minimum unit for use in multiplying a weighting factor of precoding vectors.

Although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Moreover, the method for forming the integrated circuit is not limited to LSI's, but may be realized as a dedicated circuit or a general-use processor. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-107836, filed on Apr. 27, 2009, including the specification, drawings and abstract, is incorporated herein by reference in its entirety.

INDUSTRIAL APPLICABILITY

The present invention provides a radio communication apparatus and a radio communication method that exert such effects that, upon simultaneously transmitting data signals to which turbo code is applied from a plurality cells, it becomes possible to prevent degradation of demodulation performances due to variation of signal quality, and are applicable to a radio communication system such as a cellular system.

REFERENCE SIGNS LIST

100 Transmitting apparatus
101 Scheduling section
102 CoMP user processing block
103 Non-CoMP user processing block
104 Coding section
105 Rate-matching section
106 Modulation-mapping section
107 DM-RS generating section
108 Precoding process section
109 Downlink control signal generating section
110 CRS generating section
111-1 to 111-4 RF transmission section
112-1 to 112-4 Antenna
200 Receiving apparatus
201-1 to 201-4 Antenna
202-1 to 202-4 RF reception section
203 Channel estimation section
204 MIMO demodulation section
205 Likelihood combining section
206 Decoding section
207 CRC check section
208 CQI measuring section 209 Feedback information generating section
210 Coding section
211 Multiplexing section
212 RF transmission section

The invention claimed is:

1. A communication apparatus that performs a coordinated multipoint communication with another cell, the communication apparatus comprising:
   circuitry, which, in operation, map a physical downlink shared channel (PDSCH) on a resource in accordance with a number of antenna ports for a cell-specific reference signal and a MBMS single frequency network (MBSFN) sub-frame configuration, a first portion of the PDSCH being mapped on a first resource, on which a control signal or a cell-specific reference signal is not mapped, and a second portion of the PDSCH being mapped on a second resource, on which a control signal or a cell-specific reference signal is allowed to be mapped in the other cell; and
   a transmitter, which, in operation, transmits the PDSCH,
   wherein the PDSCH is divided into two portions, the first portion is a former portion of the two portions and includes systematic bits, the second portion is a latter portion of the two portions and includes parity bits, and a number of the systematic bits that are mapped to the first resource, on which the control signal or the cell-specific reference signal is not mapped, is greater than a number of the systematic bits that are mapped to the second resource, on which the control signal or the cell-specific reference signal is allowed to be mapped in the other cell.

2. The communication apparatus according to claim 1, wherein the first portion is a portion corresponding to a redundancy version that is notified to a communication party apparatus by the control signal, and the second portion is a portion corresponding to the redundancy version to which an offset is applied.

3. The communication apparatus according to claim 1, wherein the second resource is a resource which depends on a number of symbols to be used for transmission of the control signal.

4. The communication apparatus according to claim 1, wherein the second resource is a resource which depends on a frequency shift applied to the cell-specific reference signal and a number of antenna ports to be used for transmission of the cell-specific reference signal.

5. The communication apparatus according to claim 1, wherein the first resource is a resource to be used for data transmission in MBMS single frequency network (MBSFN) sub-frames.

6. The communication apparatus according to claim 1, wherein the second resource is a resource to be used for transmission of the cell-specific reference signal by a cell having the smallest number of transmissions of cell-specific reference signals among a plurality of cells.

7. The communication apparatus according to claim 1, wherein no signal is mapped on a resource, on which the cell-specific reference signal is mapped in the other cell.

8. A communication method that performs a coordinated multipoint communication with another cell, the communication method comprising:
   mapping a physical downlink shared channel (PDSCH) on a resource in accordance with a number of antenna ports for a cell-specific reference signal and a MBMS single frequency network (MBSFN) sub-frame configuration, a first portion of the PDSCH being mapped on a first resource, on which a control signal or a cell-specific reference signal is not mapped, and a second portion of the PDSCH being mapped on a second resource, on which a control signal or a cell-specific reference signal is allowed to be mapped in the other cell; and
   transmitting the PDSCH,
   wherein the PDSCH is divided into two portions, the first portion is a former portion of the two portions and includes systematic bits, the second portion is a latter portion of the two portions and includes parity bits, and a number of the systematic bits that are mapped to the first resource, on which the control signal or the cell-specific reference signal is not mapped, is greater than a number of the systematic bits that are mapped to the second resource, on which the control signal or the cell-specific reference signal is allowed to be mapped in the other cell.

9. The communication method according to claim 8, wherein the first portion is a portion corresponding to a redundancy version that is notified to a communication party apparatus by the control signal, and the second portion is a portion corresponding to the redundancy version to which an offset is applied.

10. The communication method according to claim 8, wherein the second resource is a resource which depends on a number of symbols to be used for transmission of the control signal.

11. The communication method according to claim 8, wherein the second resource is a resource which depends on a frequency shift applied to the cell-specific reference signal and a number of antenna ports to be used for transmission of the cell-specific reference signal.

12. The communication method according to claim 8, wherein the first resource is a resource to be used for data transmission in MBMS single frequency network (MBSFN) sub-frames.

13. The communication method according to claim 8, wherein the second resource is a resource to be used for transmission of the cell-specific reference signal by a cell having the smallest number of transmissions of cell-specific reference signals among a plurality of cells.

14. The communication method according to claim 8, wherein no signal is mapped on a resource, on which the cell-specific reference signal is mapped in the other cell.

* * * * *